(12) United States Patent
Djordjevic et al.

(10) Patent No.: US 7,370,554 B2
(45) Date of Patent: May 13, 2008

(54) MOVEABLE CONTROL PEDAL ASSEMBLY

(75) Inventors: Nebojsa Djordjevic, Toronto (CA); Richard Olichwier, North York (CA)

(73) Assignee: Magna Closures Inc., Newmarket, Ontario (CA)

( * ) Notice: Subject to any disclaimer, the term of this patent is extended or adjusted under 35 U.S.C. 154(b) by 0 days.

(21) Appl. No.: 10/578,288

(22) PCT Filed: Nov. 15, 2004

(86) PCT No.: PCT/CA2004/001959

§ 371 (c)(1),
(2), (4) Date: May 5, 2006

(87) PCT Pub. No.: WO2005/048001

PCT Pub. Date: May 26, 2005

(65) Prior Publication Data

US 2007/0039404 A1    Feb. 22, 2007

(51) Int. Cl.
*G05G 1/14* (2006.01)
(52) U.S. Cl. ............................... 74/512; 74/560
(58) Field of Classification Search ................ 74/512, 74/513, 514, 560, 542
See application file for complete search history.

(56) References Cited

U.S. PATENT DOCUMENTS 3,643,525 A * 2/1972 Gibas ..................... 74/512
3,828,625 A * 8/1974 Bruhn, Jr. .................... 74/512
4,870,871 A * 10/1989 Ivan ............................. 74/513
4,875,385 A    10/1989 Sitrin
5,884,532 A    3/1999 Rixon et al.
5,927,154 A    7/1999 Elton et al.
6,073,515 A * 6/2000 Elton et al. .................... 74/564
6,189,409 B1 * 2/2001 Neag et al. .................... 74/512
6,360,629 B2 * 3/2002 Schambre et al. ............. 74/512
6,431,021 B1    8/2002 Djordjevic et al.
6,443,028 B1 * 9/2002 Brock ......................... 74/512
6,516,683 B2 * 2/2003 Sundaresan et al. .......... 74/560
6,736,233 B2 * 5/2004 Beishline et al. ............ 180/334
6,782,776 B2 * 8/2004 Oberheide et al. ............ 74/512

FOREIGN PATENT DOCUMENTS

WO    WO 01/76924 A2    10/2001

* cited by examiner

*Primary Examiner*—David Fenstermacher
*Assistant Examiner*—Matthew A. Johnson
(74) *Attorney, Agent, or Firm*—Clark Hill PLC

(57) ABSTRACT

A moveable control pedal assembly includes a pedal carriage to which a pedal arm is mounted. The pedal carriage can be moved forward and backward via threaded extender rods which engage the pedal carriage to move it along the extender rods when they are rotated. A threaded control rod, extending between the pedal arm and a control device, such as a hydraulic cylinder or control cable, rotates with the extender rods and allows movement of the pedal carriage and pedal arm without altering the mechanical advantage provided by the pedal arm and without altering the lateral positioning of the control rod.

5 Claims, 5 Drawing Sheets

MOVEABLE CONTROL PEDAL ASSEMBLY

FIELD OF THE INVENTION

The present invention relates to a control pedal assembly for motor vehicles and the like. More specifically, the present invention relates to control pedals for motor vehicles which pedals can be moved by the operator of the vehicle to accommodate different sized operators and/or different operating conditions.

BACKGROUND OF THE INVENTION

The ergonomics and safety of motor vehicles have undergone many improvements. One of these improvements has been the increased range of adjustments that can be made to the positioning of the vehicle operator and the positioning of the operating controls of the vehicle with respect to the operator. Specifically, in addition to providing a variety of positioning adjustments to the operator's seat, many vehicles now provide adjustments to the steering wheel height and distance and the forward and backward positioning of the control pedals (brake, accelerator and/or clutch) with respect to the operator's position.

An example of an adjustable pedal is shown in U.S. Pat. No. 6,431,021 which shows a pedal which can be moved about a pivot point to adjust the pedal position forward and backward as desired. Published PCT application WO 01/6924 shows another adjustable pedal which moves about pivot points to allow forward and backward adjustment.

While prior art adjustable pedals have been well received in the marketplace, they do suffer from some problems. For example, some adjustable pedals are quite complex and expensive to manufacture. Further, movement of the pedals in many of the prior art adjustable pedal mechanisms is achieved by pivoting a sub-assembly of the pedal mechanism through a circular path about a pivot point. This pivoting motion changes the geometry between the pedal, its mounting bracket and the rod or cable being acted on by the pedal. Thus, adjustment of the pedals along the circular path about the pivot also alters the mechanical advantage provided by the pedal assembly and this results in the controls of the vehicle operating somewhat differently when the pedals are adjusted to different positions. Other prior art adjustable pedals also suffer from changing mechanical advantage between the pedal and the control cable or rod as the position of the pedal is adjusted. Such a variation in the operation of the vehicle controls is clearly undesirable.

It is therefore desired to have a moveable control pedal assembly which is not overly complex and/or expensive to manufacture and which does not alter the operation of the vehicle controls when moved into different positions.

SUMMARY OF THE INVENTION

It is an object of the present invention to provide a novel moveable control pedal assembly which obviates or mitigates at least one disadvantage of the prior art.

According to a first aspect of the present invention, there is provided a control pedal assembly moveable toward and away from a vehicle operator, comprising: a mounting bracket; at least one pedal arm; a pedal carriage to which the pedal arm is pivotally attached; an extender mechanism connected to the mounting bracket and including: at least one extender rod having a threaded portion and a portion engaged to a first driven gear, the threaded portion of the extender rod engaging a complementary threaded bore in a bushing attached to the pedal carriage, the extender rod being substantially prevented from lateral movement; a control rod having a threaded portion and a portion to engage a second driven gear, the threaded portion of the control rod engaging a complementary threaded bore in a bushing attached to the pedal arm, the portion engaging the second driven gear being laterally movable through the second driven gear; and a driving gear engaging the first and second driven gears such that, when the driving gear is rotated in a first direction by a driving means, the pedal carriage is moved toward the mounting bracket and when the driving gear is rotated in a second direction by a driving means, the pedal carriage is moved away from the mounting bracket.

Preferably, at least two extender rods are provided between the extender mechanism and the pedal carriage. In another embodiment, at least two pedal arms are pivotally mounted to the pedal carriage, each pedal arm has a threaded bushing and a separate control rod engages each respective pedal arm and each control rod has its own driven gear.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
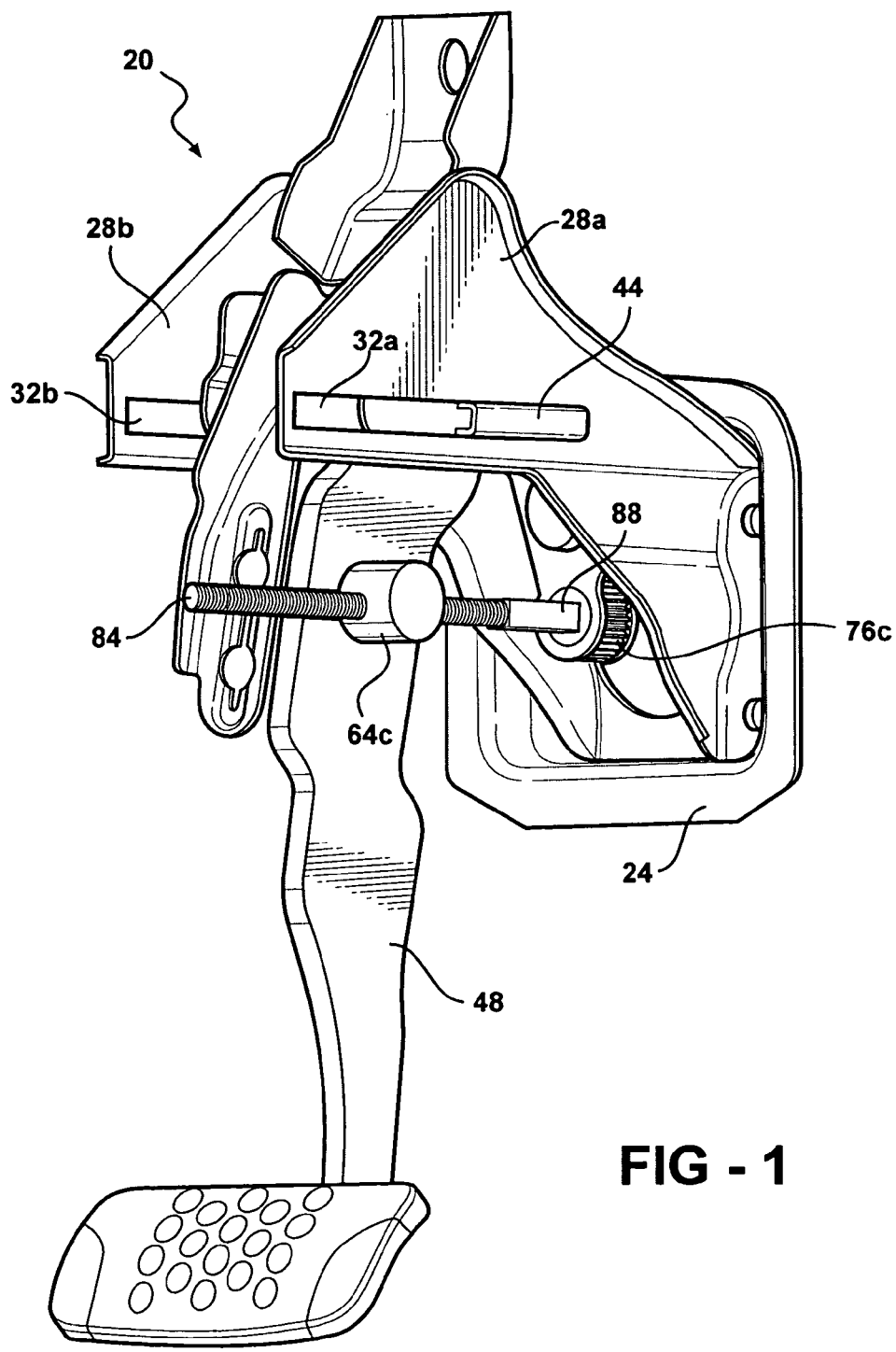
FIG. 1 shows a perspective view of a control pedal assembly in accordance with the present invention.
Figure 2:
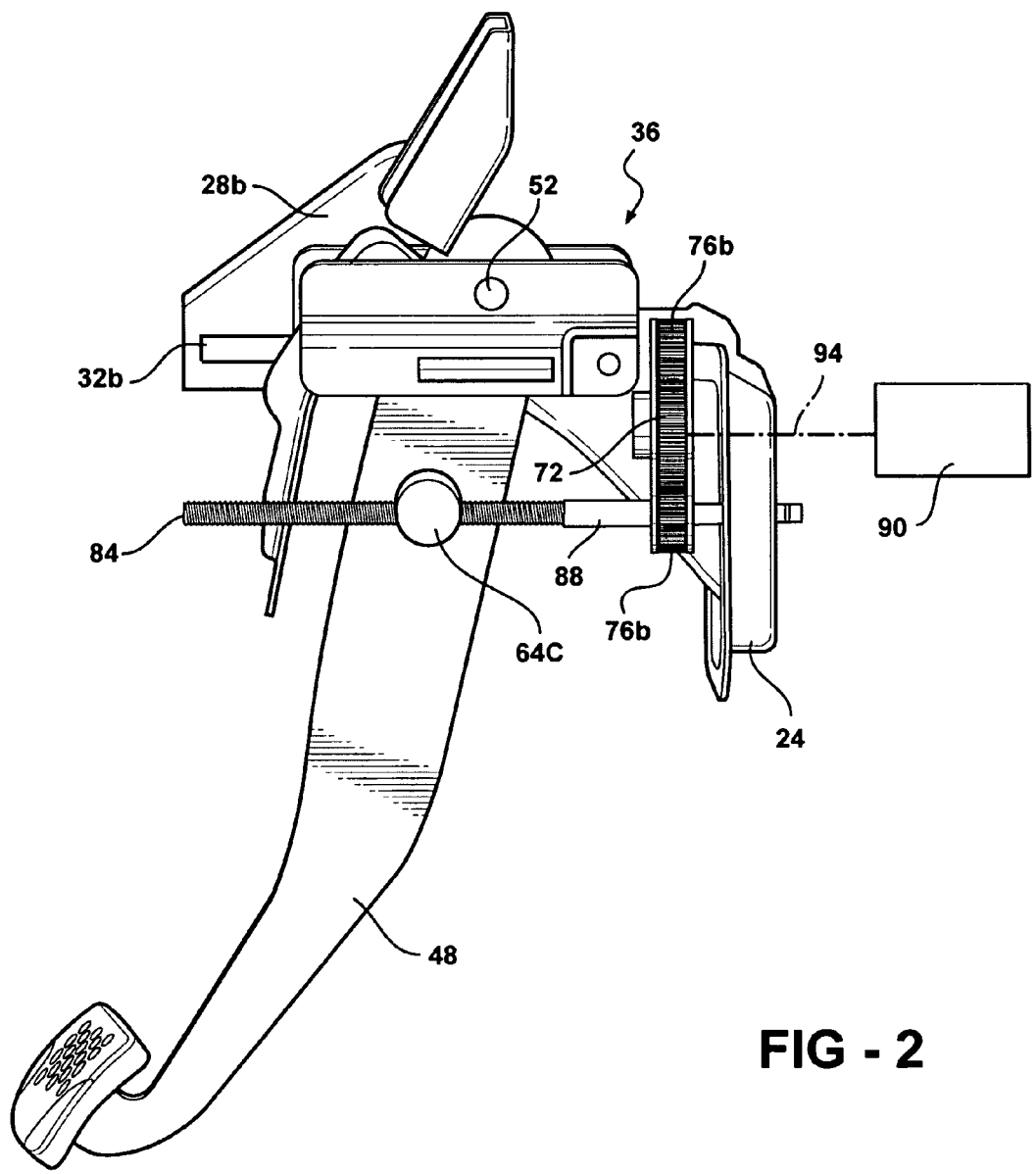
FIG. 2 shows a partially cut away side view of the control pedal assembly of FIG. 1.

A control pedal assembly in accordance with an embodiment of the present invention is indicated generally at 20 in FIGS. 1 through 5, wherein like components are indicated with like reference numerals.

Figure 3:
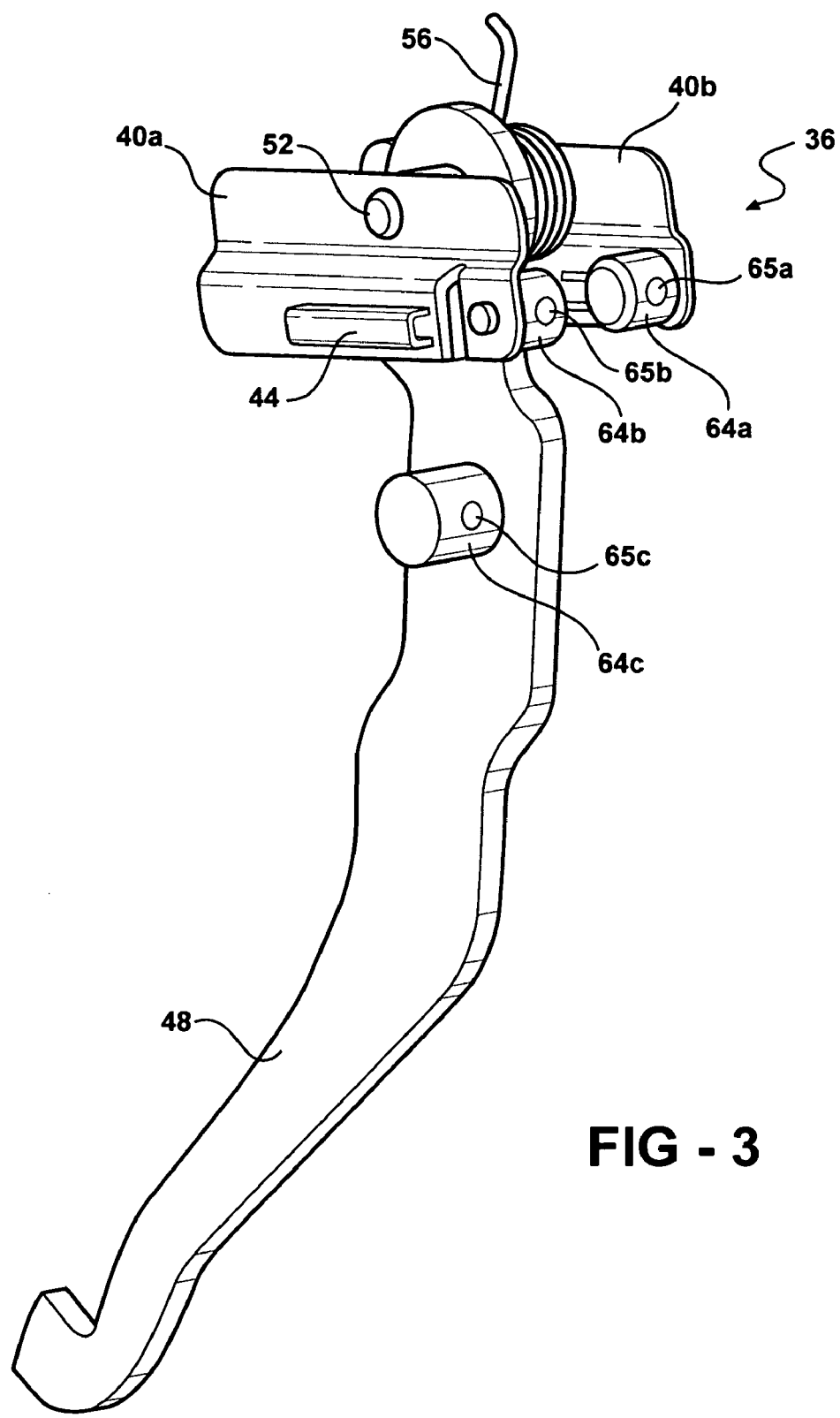
FIG. 3 shows side view of a pedal carriage and pedal arm of the control pedal assembly of FIG. 1.

Assembly 20 includes a bracket 24 by which assembly 20 is mounted to a vehicle body (not shown) and bracket 24 includes a pair of spaced arms 28a, 28b which extend forwardly from bracket 24. Arms 28a, 28b each include a slot 32 in which a pedal carriage 36 is carried. As best seen in FIG. 3, pedal carriage 36 comprises carriage sides 40a, 40b to which sliders 44 are mounted. Sliders 44 engage slots 32 in arms 28a, 28b and allow pedal carriage 36 to move forward and backward along slots 32.

A pedal arm 48 is pivotally mounted to pedal carriage 36 by a pin 52 which extends between carriage sides 40a, 40b and a coil return spring 56, about pin 52, acts between pedal arm 48 and pedal carriage 36 to bias pedal arm 48 to an unengaged position.

Each side 40a, 40b of pedal carriage 36 includes a bushing 64 with a threaded bore 65 and another bushing 64 with the threaded bore 65 is provided on arm 48. The threads of the threaded bore 65 in each bushing 64 have the same pitch as the threads of the threaded bore 65 in each other bushing 64. Bushing 64 on pedal arm 48 is rotatably mounted to pedal arm 48 allowing the threaded bore 65 to remain generally in the same horizontal orientation through the range of movement of pedal arm 48 about pin 52.

Figure 4:
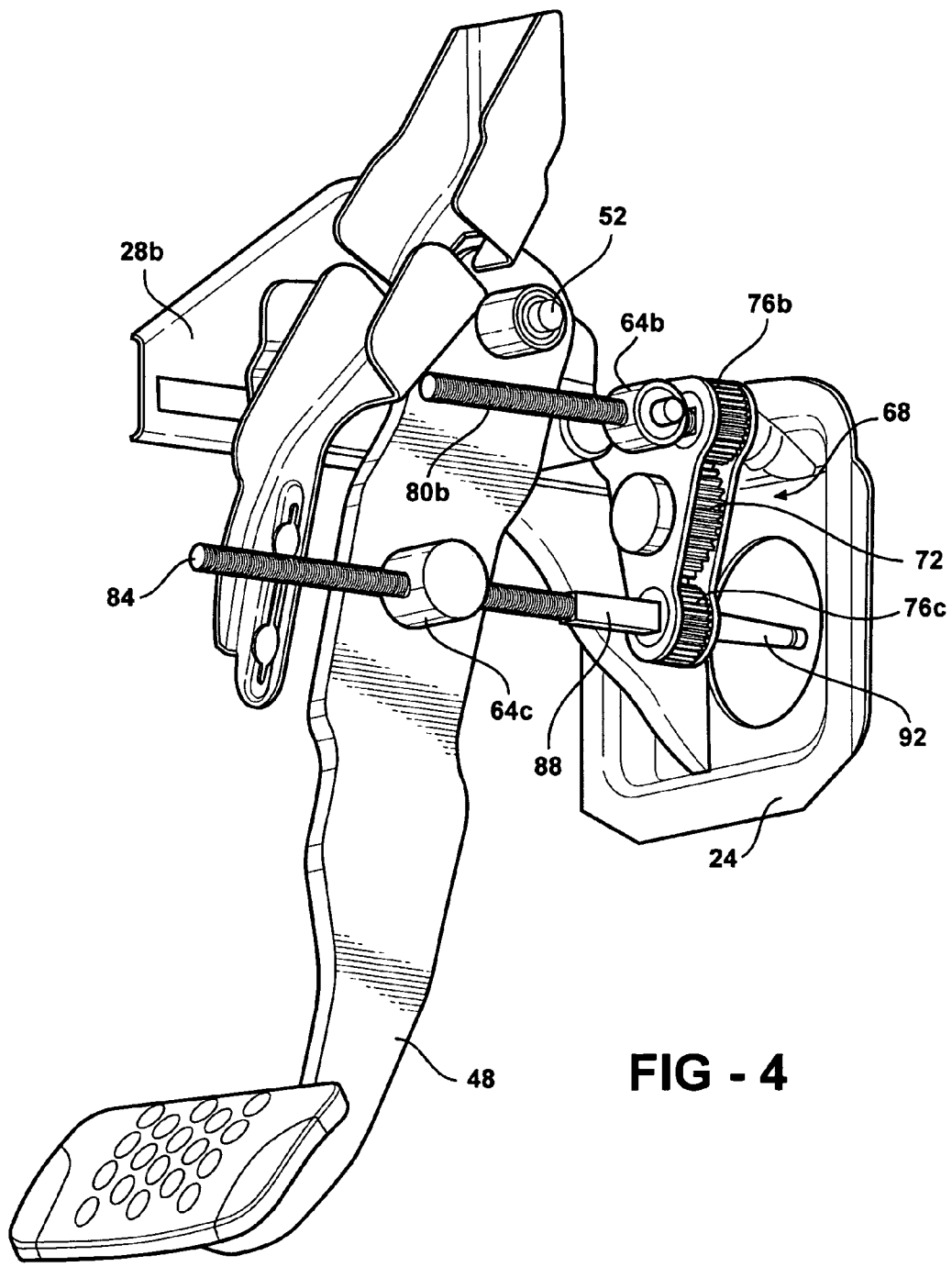
FIG. 4 shows another partially cut away side view of the control pedal assembly of FIG. 1.
Figure 5:
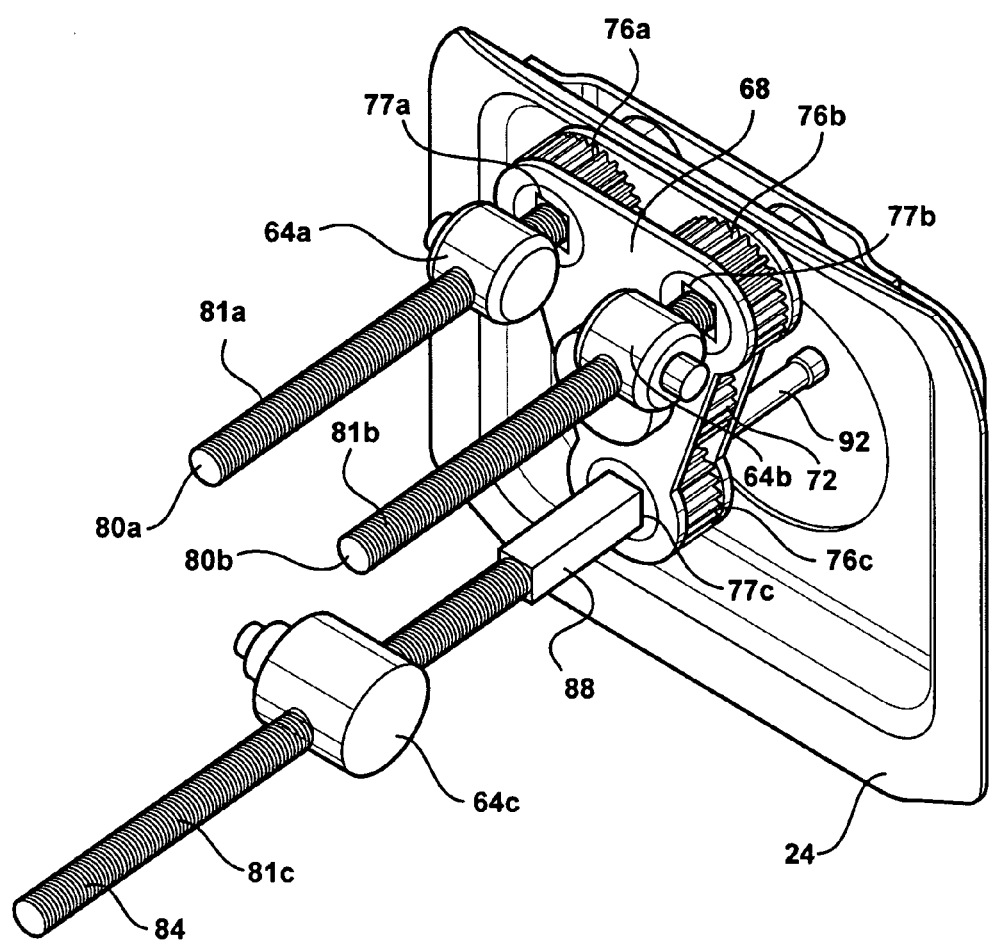
FIG. 5 shows an extender mechanism and extender rods and a control rod of the control pedal assembly of FIG. 1.

As best seen in FIGS. 4 and 5, an extender mechanism 68 is mounted to bracket 24 and includes a driver gear 72 and three driven gears 76a, 76b and 76c. Each driven gear 76a, 76b, 76c has a square center passage 77 which engages a complementary square cross-sectioned portion 88 of a respective extender rod 80a and 80b and a control rod 84. Each extender rod 80a, 80b, and control rod 84, includes a threaded portion 81 which engages the complementary threaded bore 65 in a respective bushing 64 and extender rods 80a and 80b are rotatably mounted to bracket 24 such that lateral movement of extender rods 80a and 80b is prevented while rotation is permitted.

Unlike extender rods 80a and 80b, control rod 84 has a longer square cross-sectioned portion 88 which can slide through the square-shaped center passage 77 in driven gear 76c, permitting lateral movement of control rod 84 toward or away from bracket 24 as pedal arm 48 is pressed and released. Further, control rod 84 includes an actuator end 92 which engages a hydraulic cylinder, cable or other control mechanism which pedal arm 48 is intended to operate.

As will be apparent, when driver gear 72 is rotated, by, for example, a DC motor 90 via a cable drive 92 (shown schematically in FIG. 2) or any other suitable driving means, each driven gear 76a, 76b, 76c turns. As driven gears 76a, 76b, 76c rotate, they each rotate a respective extender rod 80a, 80b and control rod 84 in turn. As extender rods 80a, 80b rotate, each bushing 64 on carriage sides 40a, 40b move along extender rods 80a, 80b, either moving toward bracket 24 or away from it, depending upon the direction of rotation of driver gear 72. Similarly, as control rod 84 rotates, bushing 64 on pedal arm 48 moves along control rod 84, either moving toward bracket 24 or away from it, depending upon the direction of rotation of driver gear 72.

As can now be readily seen, when a suitable driving means is activated by a vehicle operator, rotating driver gear 72, extender rods 80a and 80b and control rod 84 are rotated and bushings 64 move along them. As bushings 64 are moved along extender rods 80a, 80b, pedal carriage 36 moves either toward or away from bracket 24. Pedal arm 48 also moves with pedal carriage 36, toward or away from bracket 24, without altering the lateral positioning of actuator end 92 of control rod 84 and without altering the geometry of pedal arm 48 with respect to pin 52. Thus, the mechanical advantage on control rod 84 provided by pedal arm 48 does not change as pedal carriage 36 is moved along extender rods 80a and 80b.

While it is presently preferred that a pair of extender rods 80a, 80b be provided between extender mechanism 68 and pedal carriage 36, it is contemplated that in some embodiments, the control pedal assembly 20 can include only a single extender rod 80 between pedal carriage 36 and extender mechanism 68. It is also contemplated that in other embodiments more than two extender rods 80 can be provided between pedal carriage 36 and extender mechanism 68.

While not shown, it will also be apparent to those of skill in the art that two or more pedals, such as an accelerator and a brake pedal, can be mounted to a single pedal carriage 36 which is moved by one, two or more extender rods 80 as desired. In such a case, each pedal will have its own control rod 84, driven gear 76 and bushing 64 to allow the pedals to be moved towards or away from bracket 24 as a group with pedal carriage 36, while not altering the mechanical advantage provided by the pedals and not laterally moving the actuator end 92 of each respective control rod 84.

Conversely, if it is desired to provide adjustment of each pedal independently of each other pedal, then each pedal can be provided with its own pedal carriage 36, extending mechanism 68, etc.

The above-described embodiments of the invention are intended to be examples of the present invention and alterations and modifications may be effected thereto, by those of skill in the art, without departing from the scope of the invention which is defined solely by the claims appended hereto.

We claim:

1. A control pedal assembly moveable toward and away from a vehicle operator, comprising:
   a mounting bracket;
   at least one pedal arm;
   a pedal carriage to which the pedal arm is pivotally attached;
   an extender mechanism connected to the mounting bracket and including:
   at least one extender rod having a threaded portion and a portion engaged to a first driven gear, the threaded portion of the extender rod engaging a complementary threaded bore in a bushing attached to the pedal carriage, the extender rod being substantially prevented from lateral movement;
   a control rod having a threaded portion and a portion to engage a second driven gear, the threaded portion of the control rod engaging a complementary threaded bore in a bushing directly attached to the pedal arm, the portion engaging the second driven gear being laterally movable through the second driven gear and the end distal the threaded portion actuating a mechanism to be controlled; and
   a driver gear engaging the first and second driven gears such that, when the driver gear is rotated in a first direction by a driving means, the pedal carriage is moved toward the mounting bracket and when the driver gear is rotated in a second direction by the driving means, the pedal carriage is moved away from the mounting bracket.

2. The control pedal assembly of claim 1 wherein said extender mechanism includes two extender rods and the pedal carriage includes two bushings, each bushing having a threaded bore and engaging a different one of the two extender rods.

3. The control pedal assembly of claim 1 wherein the driving means includes a DC motor.

4. The control pedal assembly of claim 1 wherein the driving means includes a cable drive driven by a DC motor.

5. The control pedal assembly of claim 1 wherein the bushing directly attached to the pedal arm is rotatably mounted to the pedal arm.

* * * * *

UNITED STATES PATENT AND TRADEMARK OFFICE
CERTIFICATE OF CORRECTION

PATENT NO.        : 7,370,554 B2
APPLICATION NO.   : 10/578288
DATED             : May 13, 2008
INVENTOR(S)       : Djordjevic et al.

It is certified that error appears in the above-identified patent and that said Letters Patent is hereby corrected as shown below:

Col. 2 lines 45-53 Please replace paragraph with the following rewritten paragraph:
-- Assembly 20 includes a bracket 24 by which assembly 20 is mounted to a vehicle body (not shown) and bracket 24 includes a pair of spaced arms 28a, 28b which extend forwardly from bracket 24. Arms 28a, 28b each include a slot 32a, 32b in which a pedal carriage 36 is carried. As best seen in FIG. 3, pedal carriage 36 comprises carriage sides 40a, 40b to which sliders 44 are mounted. Sliders 44 engage slots 32a, 32b in arms 28a, 28b and allow pedal carriage 36 to move forward and backward along slots 32a, 32b. --

Col. 2 lines 59-67 Please replace paragraph with the following rewritten paragraph:
-- Each side 40a, 40b of pedal carriage 36 includes a bushing 64a, 64b with a threaded bore 65a, 65b and another bushing 64c with [[the]] a threaded bore 65c is provided on arm 48. The threads of the threaded bore 65a, 65b, 65c in each bushing 64a, 64b, 64c have the same pitch as the threads of the threaded bore 65a, 65b, 65c in each other bushing 64a, 64b, 64c. Bushing 64c on pedal arm 48 is rotatably mounted to pedal arm 48 allowing the threaded bore 65c to remain generally in the same horizontal orientation through the range of movement of pedal arm 48 about pin 52. --

Col. 3 lines 1-12 Please replace paragraph with the following rewritten paragraph:
-- As best seen in FIGS. 4 and 5, an extender mechanism 68 is mounted to bracket 24 and includes a driver gear 72 and three driven gears 76a, 76b and 76c. Each driven gear 76a, 76b, 76c has a square center passage 77a, 77b, 77c which engages a complementary square cross-sectioned portion 88 of a respective extender rod 80a and 80b and a control rod 84. Each extender rod 80a, 80b, and control rod 84, includes a threaded portion 81a, 81b, 81c which engages the complementary threaded bore 65a, 65b, 65c in [[a]] the respective bushing 64a, 64b, 64c and extender rods 80a and 80b are rotatably mounted to bracket 24 such that lateral movement of extender rods 80a and 80b is prevented while rotation is permitted. --

Col. 3 lines 13-20 Please replace paragraph with the following rewritten paragraph:
-- Unlike extender rods 80a and 80b, control rod 84 has a longer square cross-sectioned portion 88 which can slide through the square-shaped center passage 77c in driven gear 76c, permitting lateral movement of control rod 84 toward or away from bracket 24 as pedal arm 48 is pressed and released. Further, control rod 84 includes an actuator end 92 which engages a hydraulic cylinder, cable or other control mechanism which pedal arm 48 is intended to operate. --

UNITED STATES PATENT AND TRADEMARK OFFICE
CERTIFICATE OF CORRECTION

PATENT NO. : 7,370,554 B2
APPLICATION NO. : 10/578288
DATED : May 13, 2008
INVENTOR(S) : Djordjevic et al.

It is certified that error appears in the above-identified patent and that said Letters Patent is hereby corrected as shown below:

Col. 3 lines 21-33 Please replace paragraph with the following rewritten paragraph:
-- As will be apparent, when driver gear 72 is rotated, by, for example, a DC motor 90 via a cable drive [[92]] 94 (shown schematically in FIG. 2) or any other suitable driving means, each driven gear 76a, 76b, 76c turns. As driven gears 76a, 76b, 76c rotate, they each rotate a respective extender rod 80a, 80b and control rod 84 in turn. As extender rods 80a, 80b rotate, each bushing 64a, 64b on carriage sides 40a, 40b move along extender rods 80a, 80b, either moving toward bracket 24 or away from it, depending upon the direction of rotation of driver gear 72. Similarly, as control rod 84 rotates, bushing 64c on pedal arm 48 moves along control rod 84, either moving toward bracket 24 or away from it, depending upon the direction or rotation of driver gear 72. --

Col. 3 lines 34-46 Please replace paragraph with the following rewritten paragraph:
-- As can now be readily seen, when a suitable driving means is activated by a vehicle operator, rotating driver gear 72, extender rods 80a and 80b and control rod 84 are rotated and bushings 64a, 64b, 64c move along them. As bushings 64a, 64b are moved along extender rods 80a, 80b, pedal carriage 36 moves either toward or away from bracket 24. Pedal arm 48 also moves with pedal carriage 36, toward or away from bracket 24, without altering the lateral positioning of actuator end 92 of control rod 84 and without altering the geometry of pedal arm 48 with respect to pin 52. Thus, the mechanical advantage on control rod 84 provided by pedal arm 48 does not change as pedal carriage 36 is moved along extender rods 80a and 80b. --

Signed and Sealed this

Sixth Day of October, 2009

David J. Kappos
*Director of the United States Patent and Trademark Office*